Nov. 18, 1941.   J. A. MARCHAND   2,263,097
GEOPHYSICAL PROSPECTING
Filed May 8, 1939

INVENTOR.
Joseph A. Marchand.
Jesse R. Stone
Lester B. Clark
ATTORNEYS

Patented Nov. 18, 1941

2,263,097

UNITED STATES PATENT OFFICE 2,263,097

GEOPHYSICAL PROSPECTING

Joseph A. Marchand, Houston, Tex., assignor of fifty-five per cent to Bailey Balken, Houston, Tex.

Application May 8, 1939, Serial No. 272,468

1 Claim. (Cl. 175—182)

The invention relates to methods for geophysical prospecting for the location of subsurface structures and deposits such as gas and oil.

This invention is based on the discovery that directional indications are revealed by the making of measurements about points in a prospecting area and that such indications are interpretable in terms of subsurface structures and deposits. While the invention is not confined thereto the necessary measurements may be made by the observation of potentials which are set up by telluric currents which are known to exist in the earth, such measurements being made in accordance with technique hereinafter described in greater detail. It has also been found that in making of resistivity measurements in accordance with the invention, the desired directional indications are obtainable. The principal object of the invention is to provide a simple, rapid and effective method of directional information within the prospect area thru measurements made about a point or points within such area.

Another object is to provide a method in which measurements are made about a point or points in order to obtain directional information indicative of both the location of subsurface structures and the area in which more intensive investigations should be carried out.

It is also an object to provide a method in which variations in the potential gradient produced by telluric currents about points in the prospect area are measured for directional information indicative of the sought structures.

The technique constituting the invention whereby the enumerated objects and others, are realized may be varied, the accompanying disclosure being presented by way of illustration and supplemented by the drawing in which.

Figure 2:
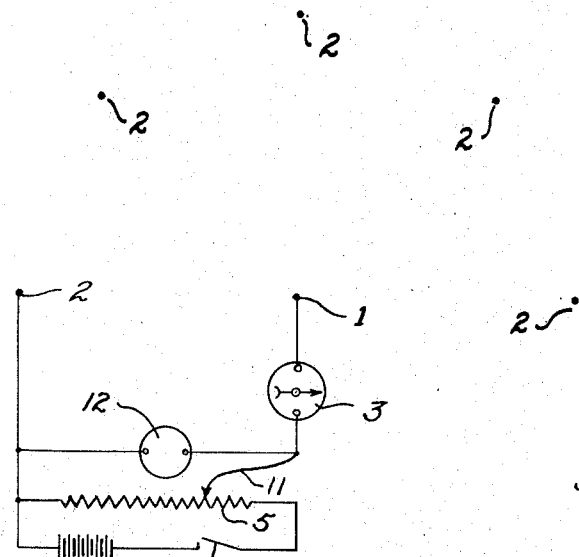
Fig. 2 illustrates the procedural operations at an observation point and embodiment of equipment which may be used for carrying out the method.

Referring first to Fig. 2 of the drawing, the reference character 1 indicates a point about which observations or measurements are to be made. An electrode is embedded in the earth at this point, such electrode being one of a pair of which the other is embedded in the ground in succession, at points 2 equidistant from the point 1 and arranged angularly thereabout.

One form of apparatus for making measurements is shown in Fig. 2 as comprising a potentiometer circuit whereby a variable potential of desired polarity from the resistor 5 may be impressed upon the electrodes at the points 1 and 2. In one manner of practicing the invention this potential is varied until the galvanometer 3 reads zero, at which time it is known that the applied potential is equal and opposite to that between the points 1 and 2. The amplitude and polarity of the indicated potential is noted.

Readings are also taken between the point 1 and a predetermined number of points 2 thereabout whereby the amplitude and direction of the maximum and minimum potential gradients are obtained.

Figure 1:
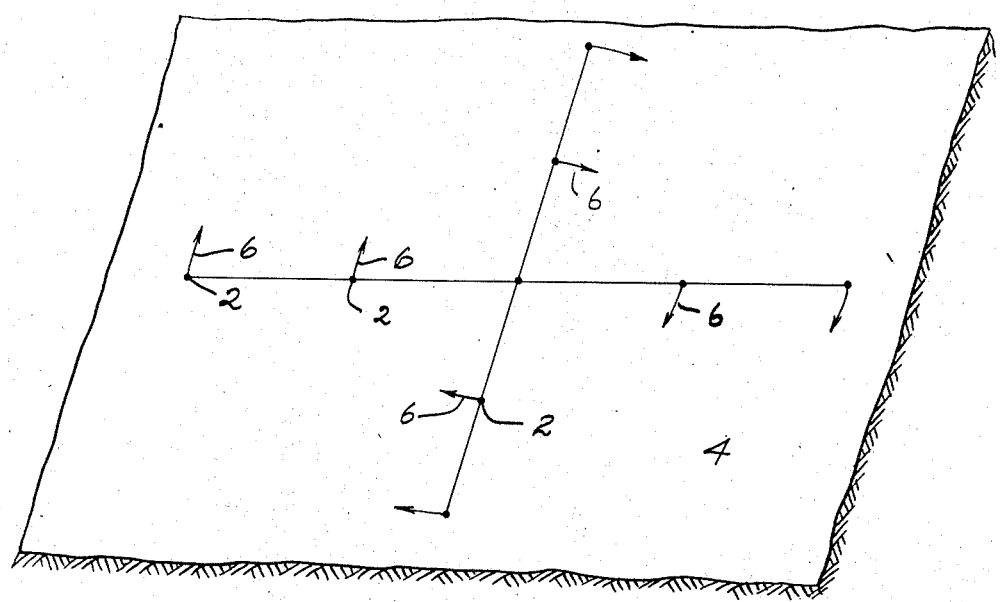
Fig. 1 is a diagrammatic areal representation of directional information obtained in accordance with the invention.

A series of such measurements is repeated about a plurality of points, as indicated by the perspective areal view of Fig. 1 in which the results at the individual points 2 are indicated by the arrows 6 within the area 4.

It has been found that the directional indications in general constitute whorls of which the configuration varies in accordance with the nature and extent of the fault, dome or other subsurface structure, which gives rise to the directional indications. At points remote from the structure the indications are such as to lead the prospector toward the structure about which more complete information is desired.

Repeated tests have revealed that while the maximum or minimum amplitudes may vary, particularly with changes in moisture conditions yet the direction does not change and repeatable observations may therefore be obtained. It is also found, however, that when measurements are made as above described and when direct current readings are made between the electrodes at each setting thereof, the product of the current and the measured potential for any position of the electrodes is substantially constant regardless of changing terrestrial conditions. Measurements of current, when the product of potential and current are relied upon, may be readily obtained by opening the key 10 in the battery circuit and moving the slider 11 to the left upon the resistor 5 so that the millivoltmeter 12 is short-circuited. The current is then read upon the galvanometer 3, such current flowing thru the circuit constituted by the earth between the points 1 and 2, and the fixed resistance of the circuit thru the galvanometer 3.

When using the technique just described, the current flowing thru the test circuit at any instant is related to the resistivity of the earth between the points at which the electrodes are buried in the earth, since such test circuit current is due to the current flowing in the earth in the area under investigation. The resistivity of the earth is an important factor in the amplitude and distribution pattern of the earth current and hence interpretations may be made in terms of resistivity.

While the applicant is uncertain as to theories which might explain phenomena revealed in the practice of the invention as described, yet repeated tests in producing areas and in areas where subsequent drilling has resulted in production, reveal the practicability and utility of the invention which broadly comprehends a simple and effective method of exploration by the making of observations about a plurality of points in a prospect area whereby directional information indicative of the location of sought deposits is obtained.

What is claimed is:

The method of geophysical prospecting comprising the steps of measuring the potential produced by telluric currents between a point and a plurality of points spaced equidistant thereabout, measuring the current which flows through a fixed resistance connected successively between said point and each of such plurality of points, and repeating said measurements about each of a plurality of additional points within a prospect area so that such measurements of potential and current constitute information of the location and extent of sought subsurface structures.

JOSEPH A. MARCHAND.